US012649829B2

(12) United States Patent
Moustafa et al.

(10) Patent No.: US 12,649,829 B2
(45) Date of Patent: Jun. 9, 2026

(54) PHOSPHORIC ACID ESTERS, METHOD OF SYNTHETIZING THEM AND USE THEREOF AS DISPERSANTS

(71) Applicant: DS SPECIALTY CHEMICALS S.A.E., 6th of October City (EG)

(72) Inventors: Eslam Moustafa, 6th of October City (EG); Effat Aboulela, 6th of October City (EG)

(73) Assignee: DS SPECIALTY CHEMICALS S.A.E., 6th of October City (EG)

( * ) Notice: Subject to any disclaimer, the term of this patent is extended or adjusted under 35 U.S.C. 154(b) by 307 days.

(21) Appl. No.: 18/479,980

(22) Filed: Oct. 3, 2023

(65) Prior Publication Data

US 2024/0124655 A1 Apr. 18, 2024

(30) Foreign Application Priority Data

Oct. 3, 2022 (CA) ................................ CA 3178210

(51) Int. Cl.
*C08G 79/04* (2006.01)
*C11D 1/78* (2006.01)
*C11D 3/12* (2006.01)

(52) U.S. Cl.
CPC ................ *C08G 79/04* (2013.01); *C11D 1/78* (2013.01); *C11D 3/1213* (2013.01)

(58) Field of Classification Search
CPC ...................................................... C08G 79/04
See application file for complete search history.

(56) References Cited

U.S. PATENT DOCUMENTS

| | | | |
|---|---|---|---|
| 3,437,514 | A | 4/1969 | Burlant |
| 4,289,812 | A | 9/1981 | Martin |
| 4,434,278 | A | 2/1984 | Skiscim |
| 4,456,485 | A | 6/1984 | Iyengar |
| 4,657,983 | A | 4/1987 | Skiscim |
| 4,698,099 | A | 10/1987 | Nakamura et al. |
| 4,720,514 | A | 1/1988 | Needham |
| 4,830,764 | A | 5/1989 | Wiedemann |
| 4,853,455 | A | 8/1989 | Schneider et al. |
| 4,872,916 | A | 10/1989 | Latosky |
| 4,912,245 | A | 3/1990 | Girardeau et al. |
| 5,130,463 | A | 7/1992 | Haubennestel et al. |
| 5,151,218 | A | 9/1992 | Haubennestel et al. |
| 6,051,627 | A | 4/2000 | Thetford et al. |
| 6,133,366 | A | 10/2000 | Thetford et al. |
| 2007/0293692 | A1 | 12/2007 | Pirrung et al. |

FOREIGN PATENT DOCUMENTS

| | | | |
|---|---|---|---|
| CA | 2022957 | A1 | 3/1991 |
| DE | 875725 | | 5/1953 |
| DE | 2726854 | | 6/1977 |
| EP | 0164817 | A2 | 12/1985 |
| EP | 0256427 | A2 | 2/1988 |
| EP | 0358096 | A2 | 3/1990 |
| EP | 0417490 | A2 | 3/1991 |
| EP | 0765356 | B1 | 4/1997 |
| EP | 3824732 | A1 | 5/2021 |
| FR | 2394602 | | 1/1979 |
| WO | 199719948 | | 6/1997 |
| WO | 199955762 | A1 | 11/1999 |

(Continued)

OTHER PUBLICATIONS

Lubguban et al., "Isocyanate Reduction by Epoxide Substitution of Alcohols for Polyurethane Bioelastomer Synthesis", Hindawi Publishing Corporation, International Journal of Polymer Science, vol. 2011, Article ID 936973, 8 pages doi: 10.1155/2011/936973.

(Continued)

*Primary Examiner* — Golam M Shameem
(74) *Attorney, Agent, or Firm* — Leason Ellis LLP

(57) ABSTRACT

The invention concerns a phosphoric acid ester of Formula (I) or (II), wherein: A, B and R represents an aliphatic, cycloaliphatic and/or aromatic moiety; Q represents $-CH_2-$, $-O-$ or $-COO-$; n+m is inferior to 3; and X+Y is less than 7, and wherein the phosphoric acid ester has an average molecular weight $M_n$ of 70 to 10,000 g/mol. The invention also concern the process for making the phosphoric acid ester of Formula (I) or (II), and there us as dispersants of particles in a liquid medium, such as water, solvent, plasticizer or resin. Advantageously, the process allows the preparation of new high performing polymeric phosphate esters with less acidic character that are majorly a phosphate diester. Also, a 100% active liquid solvent free polyester phosphate ester can be effectively prepared.

Formula (I)

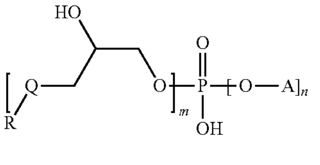

Formula (II)

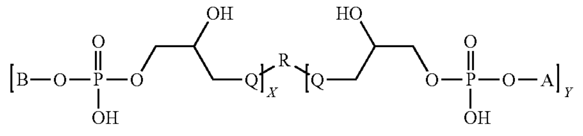

20 Claims, No Drawings

(56) References Cited

FOREIGN PATENT DOCUMENTS

| | | | |
|---|---|---|---|
| WO | 2003072632 | A1 | 9/2003 |
| WO | 2020205355 | | 10/2020 |

OTHER PUBLICATIONS

Bin Zhong et al., "Novel coating from soyben oil phosphate ester polyols", Journal of Coatings Technology, vol. 73, No. 915, Apr. 2001, pp. 53-57.

Puyou Jia et al., "Plasticizers Derived from Biomass Resources: A Short Review", Polymers Nov. 2018, 10, 1303; doi:10.3390/polym10121303.

J.D. Nordstrom et al.; Acrylic Copolymers for Radiation Cured Coatings.; Industrial Engineering Chemistry, Prod. Res. Develop., vol. 9, No. 2, Jun. 1, 1970, pp. 155-158—https://pubs.acs.org/doi/epdf/10.1021/i360034a007#.

PHOSPHORIC ACID ESTERS, METHOD OF SYNTHETIZING THEM AND USE THEREOF AS DISPERSANTS

CROSS-REFERENCE TO RELATED APPLICATIONS

This application claims priority to Canadian Patent Application No. 3,178,210 entitled "PHOSPHORIC ACID ESTERS, METHOD OF SYNTHETIZING THEM AND USE THEREOF AS DISPERSANTS", and filed on Oct. 3, 2022, the entire contents of which are incorporated by reference herein.

FIELD OF THE INVENTION

The present invention generally relates to phosphoric acid esters and their salts, the process of making them, and their different uses as dispersants, paints or moulding compositions comprising them and solids coated with them in a liquid medium.

BACKGROUND OF THE INVENTION

Generally, the liquid medium used for dispersing solid particles can either be a resin-based system either aqueous or non-aqueous or a resin-free aqueous system. To integrate particles into liquid media, high mechanical forces are required. Dispersants, which aid in the assimilation of solids into the medium, are commonly used to lessen these dispersing forces. They are surface active compounds with anionic, cationic, or non-ionic structures. These compounds are either applied in small amounts directly to the solid or added to the dispersing media in a relatively small levels of addition. Dispersed solid particles are subjected to London/van der Waals forces, which mutually attract solid particles together causing their flocculation. Dispersing agents are used to overcome mutual forces of attraction of dispersed solids preventing their re-agglomerate after the dispersion process by forming an adsorption layer on surface of solid particles counteracting these attraction forces.

The high viscosity of liquid systems with high solids content is also a significant factor. To function economically, the solids content of such solid-containing dispersions is kept as high as possible in the dispersion, while the viscosity of the system to be dispersed is kept as low as possible. This is especially important in liquid synthetic resin systems like unsaturated polyester resins, where a low initial working viscosity with the highest feasible solids content is needed and in aqueous pigment dispersions in which low viscosity and its stability upon storage is significant.

However, during and after dispersion, the surrounding medium interacts with the solid particle, allowing desorption of the surfactant in exchange for the surrounding medium present at a higher concentration. Since the surrounding medium is incapable of forming such solid adsorption layers, flocculation of the entire system happens. This leads to increased viscosity in liquid systems, loss of gloss, colour shifts in paints and coatings, insufficient development of colouring power in pigmented plastics and lacquers, and a decrease in the mechanical strength of reinforced plastics.

Pigment dispersions incorporating phosphoric acid esters of monohydroxy-terminated polyesters as dispersants are described in U.S. Pat. No. 4,698,099, the entire contents of which are incorporated by reference herein. The phosphoric acid esters discussed above can produce good outcomes in many circumstances. These compounds, on the other hand, are not extensively used in modern binding resins and plastic systems, such as high solids paints, aqueous paints, ultraviolet and electron beam toughened systems, or LS SMC or LP-SMC moulding compositions (low-shrink or low-profile sheet moulding compositions). These chemicals are insufficiently compatible in a variety of systems. Due to insufficient interaction with the surrounding media, this results in poor dispersion and, in many situations, precipitation, which causes dulling, spotting, and increased viscosity.

Phosphoric acid esters and their salts matching to the formula described in the European Patent EP 0417 490 B1 (Byk-Chemie) where R is an aliphatic, cycloaliphatic, and/or aromatic residue with at least one ether oxygen (—O) and at least one carboxylic acid ester group (—COO—) and/or urethane group (—NHCOO). An example having nonylphenol ethoxylate reacted with caprolactone and its phosphate ether derivative is reported in the mentioned patent the entire contents of which are incorporated by reference herein.

A dispersant was made by reacting a polyethyleneglycol with a hydroxycarboxylic acid and/or an alkylene oxide to produce a polymeric diol and then phosphating the diol, according to the European Patent EP765356 B1 (Zeneca), the entire contents of which are incorporated by reference herein.

Dispersants are phosphate esters of block copolymers that comprise both poly(alkyleneoxy) and polyester chain segments, according to Canadian Patent Application No 2,022,957, the entire contents of which are incorporated by reference herein. A phosphate ester of a block copolymer that is polyethyieneglycol monomethyl ether of MW 750 polymerized with Valerolactone. When the MW of the polyethyleneglycol chain segment is bigger than the MW of the polyester chain segment, phosphate esters of block copolymers of this type show superior capabilities as dispersants for aqueous mill-base.

U.S. Pat. No. 3,437,514 and Industrial Engineering Chemistry, Prod. Res. Develop, Vol. 9, No. 2, pp. 155-158 describe acrylated esters of glycidyl methacrylate copolymers (1970), the entire contents of which are incorporated by reference herein.

German Pat. No. 875,725 describes hardenable combinations of bisphenol A diglycidyl ethers and phosphoric acid as a hardener, the entire contents of which are incorporated by reference herein. The mixes are excellent for coating manufacture and have a strong adhesive strength, which is particularly noticeable on ferrous metals. They also have a high chemical resistance and a high degree of elasticity.

U.S. Pat. No. 4,289,812, the entire contents of which are incorporated by reference herein, describes water-soluble or water-dispersible compounds generated by reacting epoxy resins, in particular diglycidyl ethers based on bisphenol, with phosphoric acid or condensed phosphoric acids, such as pyrophosphoric acid, and then neutralising them.

U.S. Pat. No. 4,434,278, the entire contents of which are incorporated by reference herein, describes phosphate esters of partly acrylated glycidyl polyethers of polyhydric phenols, which was issued on Feb. 28, 1984.

WO 97/19948, the entire contents of which are incorporated by reference herein, describes a dispersant that is a phosphate ester of a block copolymer RO—$(C_2H_4O)_m$(PES)$_n$—OH, where R is C1-4-alkyl, PES is a polyester produced from a cyclic lactone such as valerolactone or e-caprolactone, m is 5 to 60, n is 2 to 30, and the molecular weight of RO. The dispersants are believed to be very effective at dispersing particulate particles in aqueous media, such as pigments. It has now been discovered that utilising more than one hydroxycarboxylic acid or lactone to produce the polyester (PES)n can result in dispersants with superior features such as solubility in the liquid media.

Phosphoric acid esters with a variety of structures have been reported for use in dispersion and treating pigments, for example acidic or neutral phosphoric acid esters of fatty alcohols and alkoxylated fatty alcohols are described in U.S. Pat. No. 4,456,485, the entire contents of which are incorporated by reference herein, as agents for treating certain blue pigments (alkali blue). Similarly, European Patent Application No. EP256,427 (the entire contents of which are incorporated by reference herein) details the preparation of pigment dispersions suitable for aqueous applications using previously described phosphoric acid esters of alkoxylated fatty alcohols.

U.S. Pat. No. 4,717,424, the entire contents of which are incorporated by reference herein, begins with carboxyl groups containing phosphoric acid esters, which have a free —COOH group in addition to the phosphoric acid group, the entire contents of which are incorporated by reference herein. These compounds are used to protect metal pigments from water assault.

Pigment dispersions prepared with phosphoric acid esters of alkoxylates of various structures are described in U.S. Pat. No. 4,720,514, the entire contents of which are incorporated by reference herein.

Phosphoric acid esters of polyols used as dispersants in aqueous media or detergent builders are described in German Patent Application No. DE 2,726,854, the entire contents of which are incorporated by reference herein. These phosphoric acid esters are quite complex, and they also contain free hydroxyl groups derived from the epoxides utilized. In terms of the free phosphoric acid groups present in the molecules, they are clearly polyvalent.

Wetting agents are known to be made from surfactant compositions made from phosphoric acid esters of polyoxyalkylenated substances. It is also known that these compounds can be used to make aqueous suspensions of insoluble substances. Polyoxyalkylene-containing phosphoric acid esters as wetting agents are disclosed in U.S. Pat. No. 4,830,764, the entire contents of which are incorporated by reference herein. In this patent, the esters are phosphoric acid partial esters generated from a block ethoxylated and propoxylated C9-16 aliphatic alcohol, especially in the pre-treatment of cellulosic textile materials.

A mixture of at least one polyoxyalkylenated phosphoric acid monoester and at least one polyoxyalkylenated diester and a nonionic polyoxyalkylenated chemical is disclosed in U.S. Pat. No. 4,912,245 (the entire contents of which are incorporated by reference herein) as phosphoric acid ester-based compositions in acidic or neutralised form.

Phosphate esters of polyalkylene ether block copolymers and their use as dispersants are disclosed in U.S. Pat. No. 6,051,627, the entire contents of which are incorporated by reference herein, where the dispersant is a phosphate ester of a polyalkylene ether block copolymer, the ester comprising a terminal methoxy group, an ethoxy block, and a propoxy block, and the compounds are useful for dispersing particulate solids in an aqueous medium.

FR 2,394,602, the entire contents of which are incorporated by reference herein, describes a biodegradable hydrocarbon dispersion chemical made up of phosphoric acid monoesters and diesters with ethoxyl and propoxyl groups, which can be used to mitigate hydrocarbon spills on the ground or in the water.

Although effective, the reported phosphate esters still face performance challenges in performing well across different resin systems and pigments with a wide variation in gloss and viscosity profile and color properties of pigment dispersions. A particular challenges is being faced in the dispersion of transparent iron oxide in saturated polyester or hydroxy acrylic resin systems.

Polymeric phosphate ester dispersing agents mentioned in literature are mostly of monoester type with a strong acidic character. Many of which performs its effect by being in its free acid form which might cause some non-required side reactions negatively affecting the intended application. In addition, most of the alkyl/aryl polyester phosphate esters prepared are in paste or solid form in its 100% active form unless a valerolactone containing polyester chain is being used. Further, phosphate esters of alkyl phenol ethoxylate are known for their excellent wetting and dispersing property in aqueous systems yet it is being banned owing to its toxicological properties.

There is thus a need for a new recyclable polymeric structure that addresses the shortcomings of the art.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect, the invention is directed to a phosphoric acid ester of Formula (I) or (II) as follows:

Formula (I)

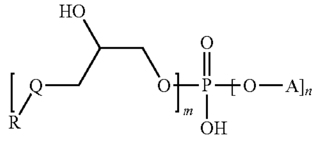

Formula (II)

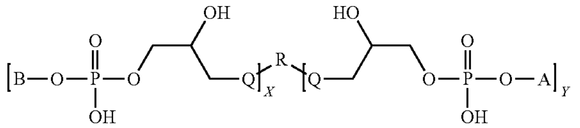

wherein: A, B and R represents an aliphatic, cycloaliphatic and/or aromatic moiety; Q represents $—CH_2—$, —O— or —COO—; n+m is inferior to 3; and X+Y is less than 7, and wherein the phosphoric acid ester has an average molecular weight $M_n$ of 70 to 10,000 g/mol.

According to a second aspect, the invention is directed to a process for the making of the phosphoric acid ester as defined herein, comprising the step of reacting an alkyl or aryl epoxide or mono/poly glycidyl ether/ester of formula (III):

Formula (III)

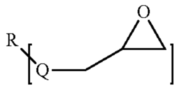, wherein R and Q are as defined in claim 1, and G is an integer from 1 to 7; with:

a mono- or diphosphate ester of formula (IV), (V), (VI) or (VII):

Formula (IV)

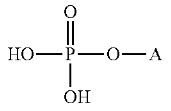

Formula (V)

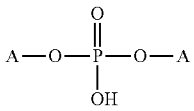

Formula (VI)

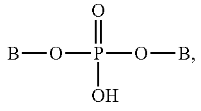

or

Formula (VII)

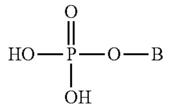

wherein A and B are as defined herein above.

According to another aspect, the invention is yet directed to a method for wetting and/or dispersing particles in a liquid medium, the method comprising:

incorporating an amount of the phosphoric acid ester as defined herein or obtained by the process as defined herein, in the liquid medium, the liquid medium comprising said particles or the particles being added to the liquid medium after said amount of the phosphoric acid ester.

According to another aspect, the invention is directed to the use of the phosphoric acid ester as defined herein or obtained by the process as defined herein, for wetting and/or dispersing particles in a liquid medium. Preferably, the particles comprises pigments, fillers or extenders in paint or coatings, composites, plastics, ink medium or mixture thereof. Preferably, the liquid medium comprises one or more of water, solvent, plasticizer or resin.

Advantageously, a new method of preparation of phosphate esters is provided, that allows the preparation of new high performing polymeric phosphate esters with less acidic character that are majorly a phosphate diester. In addition, a 100% active liquid solvent free polyester phosphate ester can be effectively prepared. The process of preparation as disclosed herein allows preparing an alkyl phenol free phosphate esters that are having same unique structural features of nonyl phenol ethoxylate.

Other and further aspects and advantages of the present invention will be better understood upon reading of the illustrative embodiments about to be described and various advantages not referred to herein will occur to one skilled in the art upon employment of the invention in practice.

DETAILED DESCRIPTION OF PREFERRED EMBODIMENTS

Novel phosphoric acid esters and their salts will be described hereinafter. Although the invention is described in terms of specific illustrative embodiments, it is to be understood that the embodiments described herein are by way of example only and that the scope of the invention is not intended to be limited thereby.

The terminology used herein is in accordance with definitions set out below.

As used herein % or wt. % means weight % unless otherwise indicated. When used herein % refers to weight % as compared to the total weight percent of the phase or composition that is being discussed.

By "about", it is meant that the value of weight %, time, temperature or the like can vary within a certain range depending on the margin of error of the method or device used to evaluate such weight %, time, or temperature. A margin of error of 10% is generally accepted.

According to a preferred embodiment, it is disclosed a phosphoric acid ester of Formula (I) or as follows:

Formula (I)

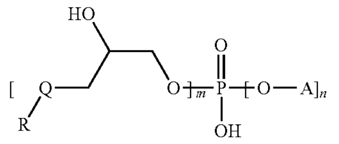

Formula (II)

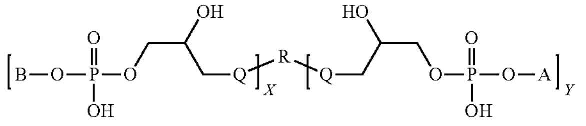

wherein: A, B and R represents an aliphatic, cycloaliphatic and/or aromatic moiety; Q represents $-CH_2-$, —O— or —COO—; n+m is inferior to 3; and X+Y is less than 7, and wherein the phosphoric acid ester has an average molecular weight $M_n$ of 70 to 10,000 g/mol.

According to a preferred embodiment, R represents an alkyl or aryl group or an aliphatic alcohol/carboxylic acid, aromatic alcohol/carboxylic acid, aliphatic alcohol alkoxylate, aliphatic alcohol alkoxylate carboxylic acid, aromatic alcohol alkoxylate, aromatic alcohol alkoxylate carboxylic acid, alkyl-aryl alkoxylate, alkyl-aryl alkoxylate carboxylic acid, aryl alkoxylate or aryl alkoxylate carboxylic acid.

According to a preferred embodiment, A and B are the same or different, and represent each an alkyl or aryl group, an alkoxylated alcohol group, an alkyl aryl alkoxylate or aryl alkoxylate group. Preferably, A and/or B are modified with a carboxylic ester functional group or an urethane functional group.

According to a preferred embodiment, the carboxylic ester functional group is from a polycaprolactone. More preferably, the polycaprolactone is an alcohol ethoxylate modified polycaprolactone.

According to another aspect, it is disclosed a process for the making of a phosphoric acid ester of Formula (I) or (II) as follows:

Formula (I)

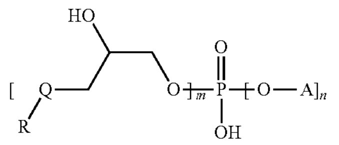

-continued

Formula (II)

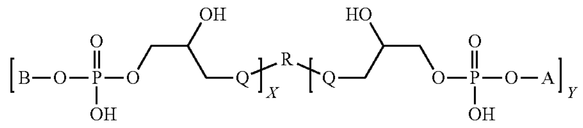

wherein: A, B and R represents an aliphatic, cycloaliphatic and/or aromatic moiety; Q represents —$CH_2$—, —O— or —COO—; n+m is inferior to 3; and X+Y is less than 7, and wherein the phosphoric acid ester has an average molecular weight $M_n$ of 70 to 10,000 g/mol, the process comprising the step of:

reacting an alkyl or aryl epoxide or mono/poly glycidyl ether/ester of formula (III):

Formula (III)

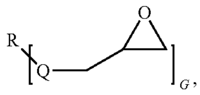

wherein R and Q are as defined herein above, and G is an integer from 1 to 7; with:

a mono- or diphosphate ester of formula (IV), (V), (VI) or (VII):

Formula (IV)

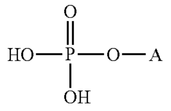

Formula (V)

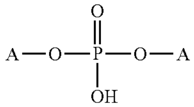

Formula (VI)

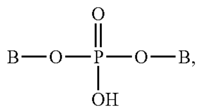

or

Formula (VII)

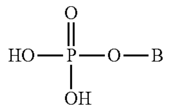

wherein A and B are as defined above.

According to a preferred embodiment, the mono- or diphosphate ester of Formula (IV), (V), (VI), or (VII) is a reaction product of A or B with polyphosphoric acid or phosphorous pentoxide.

According to another aspect, it is disclosed a method for wetting and/or dispersing particles in a liquid medium, the method comprising:

incorporating an amount of a phosphoric acid ester of Formula (I) or (II) as follows:

Formula (I)

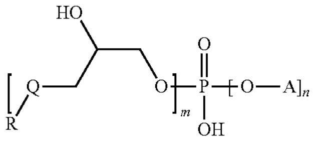

Formula (II)

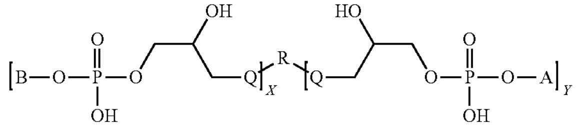

wherein: A, B and R represents an aliphatic, cycloaliphatic and/or aromatic moiety; Q represents —$CH_2$—, —O— or —COO—; n+m is inferior to 3; and X+Y is less than 7, and wherein the phosphoric acid ester has an average molecular weight $M_n$ of 70 to 10,000 g/mol;

in the liquid medium, the liquid medium comprising said particles or the particles being added to the liquid medium after said amount of the phosphoric acid ester.

In other embodiments, the phosphoric acid esters of Formula (I) and (II) as defined herein and salts thereof, can be used for wetting and/or dispersing particles in a liquid medium.

According to a preferred embodiment, the phosphoric acid ester is used in its acidic form or is neutralized with an alkali metal, ammonia or an organic amine. More preferably, the alkali metal is sodium or potassium, and the organic amine is monoalkyl, dilalkyl, trialkyl, monoalkanol, dialkanol, trialkanol amine derivative, fatty imidazoline derivatives, polyalkylenepolaymine or polalkyleneimine derivatives. More preferably, the organic amine is trialkyl amines, tall oil fatty imidazoline or acrylate modified polyethyleneimines.

According to a preferred embodiment, the particles comprises pigments, fillers or extenders in paint or coatings, composites, plastics, ink medium or mixture thereof.

According to a preferred embodiment, the liquid medium comprises one or more of water, solvent, plasticizer or resin.

EXAMPLES

The term "parts" herein means "parts by weight" or can also be expressed in "grams".

Intermediate 1 (1 Mole MPEG 350 with 5 Mole Caprolactone)

Under a protective nitrogen atmosphere, 38 parts of a methoxypolyethyleneglycol (MPEG) having an average molecular weight of 350 were combined with 62 parts caprolactone and 0.4 parts p-toluene sulfonic acid and heated to 160° C. The mixture was stirred at this temperature until a solid content of at least 98% was reached. The resulting polyether-polyester has an average molecular weight of 800.

Intermediate 2 (1 Mole MPEG 350 with 4 Moles Caprolactone)

The procedure was the same as described in Intermediate 1, except that instead of 5 mole of caprolactone, 4 mole of caprolactone (49.6 parts) was used with addition of 0.4 parts p-toluene sulfonic acid and heated to 160° C. The mixture was stirred at this temperature until a solid content of 98% or more was reached.

Intermediate 3 (I Mole MPEG 350 with 3 Mole Caprolactone and 1 Mole Valerolactone)

The procedure was the same as Intermediate 1 except that 44.16 parts of MPEG having an average molecular weight of 350 were heated with 43.20 parts of caprolactone and 12.63 parts of δ-valerolactone and heated to a temperature of 160° C. Then 0.2 parts of dibutyl tin dilaurate were added. The mixture was stirred at this temperature until a solid content of 98% or more was reached.

Intermediate 4 (Polyethyleneimine (PEI) Reaction Product with 2-ethylhexyl Acrylate)

In a four-necked flask with agitator, thermometer, reflux cooler and nitrogen inlet tube, 30 gm of epomine SP-018 are placed and heated to 80° C. with agitation under N2 gas. Then 70 gm of 2-ethyl hexyl acrylate added over period two hours, after complete addition, stirring was continued for additional 8 hours.

Intermediate 5 (Tall Oil Fatty Acid Reaction Product with Hydroxyethyl Ethylene Diamine)

In a four-neck flask equipped with a stirrer, thermometer, dropping funnel, reflux condenser and nitrogen inlet line, 1 mole of TOFA (100 parts) were added to 1 mole of the hydroxylethyl ethylene diamine (35.86 parts) and stirred for 3 hours at about 140° C. followed by heating under vacuum at 220° C. for 5 hours. The hydroxide compound was obtained.

General Synthesis Procedure for Phosphate Ester

In a four-neck flask equipped with a stirrer, thermometer, dropping funnel, reflux condenser and nitrogen inlet line, Y g of thermal 116 polyphosphoric acid were added to X g (1 mole) of the monohydroxy compound and stirred while excluding moisture. After 5 hours of stirring at about 80° C., a phosphoric acid monoester was obtained. Then Z g of epoxide compound were added at exactly 80° C. and stirred at this temperature for 6 hrs. Methoxy propyl acetate and or C9-C10 aromatic solvent may optionally be used for dilution during or after the reaction. X, Y and Z are provided in the following Table 1 below.

TABLE 1

| Example | Hydroxy compound | X (g) | Y (g) of Polyphosphoric 116 | Epoxide containing compound | Z (g) of epoxide compound |
|---|---|---|---|---|---|
| P1 | Intermediate 1 | 100 | 9.17 | C12-C14 glycidyl ether | 84.28 |
| P2 | Intermediate 2 | 87.6 | 9.16 | C12-C14 glycidyl ether | 84.28 |
| P3 | Intermediate 3 | 100 | 10.16 | Ethyl hexyl glycidyl ether | 53.22 |
| P4 | MPEG 350 | 100 | 24.14 | Ethyl hexyl glycidyl ether | 53.22 |
| P5 | Intermediate 1 | 100 | 9.17 | Ethylhexyl glycidyl ether | 20.22 |
| P6 | Lutensol ON 70 | 100 | 17.97 | Phenyl glycidyl ether | 31.9 |
| P7 | Butyl EO PO | 100 | 8.45 | Ethyl hexyl glycidyl ether | 18.63 |
| P8 | Lutensol TO7 | 100 | 16.9 | Allyl glycidyl ether | 22.9 |
| P9 | Ethylhexanol 10 ethoxylate | 100 | 14.81 | Phenyl glycidyl ether | 26.32 |
| P10 | Lutensol ON 70 | 100 | 17.97 | Styrene oxide | 25.56 |

TABLE 1-continued

| Example | Hydroxy compound | X (g) | Y (g) of Polyphosphoric 116 | Epoxide containing compound | Z (g) of epoxide compound |
|---|---|---|---|---|---|
| P11 | Butyl EO PO | 100 | 8.45 | Ethyl hexylglycidyl ether | 18.63 |
| P12 | Intermediate 1 | 100 | 9.17 | Butane diol diglycidylether | 21.97 |

Butyl EO PO: Butanol ethoxylated propoxylated with and ethylene oxide to propylene oxide molar ratio of 1:1 with an average molecular weight of 1000

Lutensol ON 70: an isodecyl alcohol 7 ethoxylate from BASF

Lutensol TO 7: an isotridecyl alcohol 7 ethoxylate from BASF

Examples P13-P16 in Table 2 below were prepared as a neutralized derivative of some of selected Examples P1-P12 of Table 1 above. Neutralizing agents can be potassium hydroxide, sodium hydroxide, ammonium hydroxide solutions or any amine containing compounds like the previously prepared Intermediate 4 and 5. Neutralization can be carried out in presence or absence of a solvent.

TABLE 2

| Examples | Phosphate ester derivative | Phosphate ester derivative quantity (parts) | Solvent | Solvent quantity (parts) | Neutralizing agent | Neutralizing agent quantity (parts) |
|---|---|---|---|---|---|---|
| P13 | P3 | 50 | — | — | Intermediate 4 | 7.99 |
| P14 | P4 | 50 | | | Intermediate 5 | 28.67 |
| P15 | P6 | 50 | Water | 40 | Sodium hydroxide (50%) | 10 |
| P16 | P11 | 50 | Water | 37.5 | Sodium hydroxide (50%) | 12.5 |

Example 1

Dispersing agents of examples P5, P6 and P9 were diluted with a mixture of 2-methoxy propyl acetate and Aromatic 100 solvent mixture of 1:1 ratio to an active ingredient of 52%. They were then evaluated in titanium dioxide dispersion in 2K-PU coating system against DELTA-DC 3080 (a commercial wetting and dispersing agent supplied by DELTA specialties) as mentioned in Table 3 below.

TABLE 3

| Component | Quantity (parts or grams) |
|---|---|
| Macrynal VSM 2706/60X | 36 |
| Dispersing agent | 3.6 |
| Titanium dioxide (Dupont-R902) | 94.5 |
| Methoxy propyl acetate and Aromatic 100 1:1 mixture | 15.9 |

Macrynal VSM 2706/60X: a hydroxy functional acrylic resin supplied by Allnex company.

Aromatic 100: C9 aromatic fluid supplied by ExxonMobil company.

Grinding was carried hour for 1 hour in a Skandex shaker using glass beads as a grinding media. The prepared pigment concentrate is then mixed with the equivalent amount of a polymeric aliphatic isocyanate and directly applied as a drawdown films. Table 4 below summarizes the results.

TABLE 4

| | DELTA-DC 3080 | P5 | P6 | P9 |
|---|---|---|---|---|
| Viscosity in mPa · s at rpm 60 and spindle 4 using brookfield viscometer | 2850 | 2860 | 3490 | 2960 |
| Gloss @ 60 | 83 | 88 | 91 | 83.6 |
| Color parameters | | | | |
| L | 95.8 | 95.89 | 96.02 | 96.06 |
| a | −1.3 | −1.34 | −1.33 | −1.29 |
| b | −0.47 | −0.65 | −0.56 | −0.50 |
| Hiding power[2] | 2 | 2 | 1 | 1 |

L, a and b are color parameters according to the Lab color scale.

Hiding power is a score from 1 to 4. 1 is the highest hiding and 4 is the lowest.

Example 2

Dispersing agents of examples P5 and P10 were diluted with a mixture of 2-methoxy propyl acetate and Aromatic 100 solvent mixture of 1:1 ratio to an active ingredient of 52%. They were then evaluated in titanium dioxide dispersion in saturated polyester/melamine formaldehyde coating system against DELTA-DC 3080 (a commercial wetting and dispersing agent supplied by DELTA specialties) as mentioned below in Table 5.

TABLE 5

| Component | Quantity (parts or grams) |
|---|---|
| Synolac 5070S-65 | 36 |
| Dispersing agent | 3.6 |
| Titanium dioxide (Dupont-R902) | 94.5 |
| Aromatic 100 | 8.9 |

Synolac 5070S-65 is a saturated polyester resin supplied by Arkema company

Grinding was carried hour for 1 hour in a Skandex shaker using glass beads as a grinding media. The prepared pigment pastes is then converted into a final white paint and mixed with equivalent amount of n-butylated high imino melamine crosslinker (SETAMINE® US-138 BB-70) and directly applied on a drawdown films and cured. Table 6 below summarizes the results for both the pigment paste and the final paint.

TABLE 6

| | DELTA-DC 3080 | P5 | P10 |
|---|---|---|---|
| Viscosity in mPa · s at rpm 60 and spindle 4 using brookfield viscometer | 7560 | 5530 | 8020 |
| Gloss @ 60 | 98 | 110 | 102 |
| Color parameters | | | |
| L | 96.6 | 96.58 | 97.09 |
| a | −1.29 | −1.28 | −1.25 |

TABLE 6-continued

| | DELTA-DC 3080 | P5 | P10 |
|---|---|---|---|
| b | 0.1 | 0.16 | 0.1 |
| Hiding power | 2 | 2 | 1 |

Example 3

Dispersing agents of examples P1, P5, P7 and P10 were diluted with a mixture of 2-methoxy propyl acetate and Aromatic 100 solvent mixture of 1:1 ratio to an active ingredient of 52%. They were then evaluated in titanium dioxide dispersion in a highly filled solvent free epoxy system against DELTA-DC 3080 (a commercial wetting and dispersing agent supplied by DELTA specialties) as mentioned below in Table 7.

TABLE 7

| Component | Quantity (parts or grams) |
|---|---|
| Epotec YD-128 | 50 |
| Dispersing agent | 2 |
| Titanium dioxide (Dupont R902) | 10 |
| Calcium carbonate | 130 |
| Benzyl alcohol | 8 |

Epotec YD-128 is a solvent free unmodified Bisphenol-A based Liquid Epoxy Resin supplied by Aditya Birla company Dispersion was carried out by 1 hour in a Skandex shaker using glass beads as a grinding media. The prepared paint is then evaluated for viscosity and flowability. Table 8 below summarizes the results:

TABLE 8

| | DELTA-DC 3080 | P1 | P5 | P7 | P10 |
|---|---|---|---|---|---|
| Viscosity in mPa · s at rpm 6 and spindle 4 using brookfield viscometer | Very high viscosity | 58290 | 53990 | 56390 | 57090 |
| Flowability | Non-flowable | flowable | flowable | flowable | Flowable |

Example 4

Dispersing agents of examples P1, P4 and P5 were diluted with a mixture of 2-methoxy propyl acetate and Aromatic 100 solvent mixture of 1:1 ratio to an active ingredient of 52%. They were then evaluated in titanium dioxide dispersion in saturated polyester/cellulose acetate butyrate (CAB) white system against DELTA-DC 3080 (a commercial wetting and dispersing agent supplied by DELTA specialties) as mentioned in Table 9 below.

TABLE 9

| Component | Quantity (parts or grams) |
|---|---|
| Synolac 5070S-65 | 12 |
| Dispersing agent | 1.2 |

TABLE 9-continued

| Component | Quantity (parts or grams) |
|---|---|
| Titanium dioxide (Dupont R902) | 31.5 |
| Methoxy propyl acetate and Butyl acetate 1:1 mixture | 5.3 |

Grinding was carried hour for 1.5 hour in a Skandex shaker using glass beads as a grinding media. The prepared pigment pastes is then mixed 1:1 with the below CAB prepared solution according to Table 10.

TABLE 10

| Component | Quantity (parts or grams) |
|---|---|
| CAB 381-2 | 8 |
| Xylene | 32 |
| Methoxy propyl acetate:Butyl acetate 1:1 mixture | 60 |

CAB 381-2 is a cellulose ester with high butyryl content supplied by Eastman company Drawdown films of the prepared paint is subject to curing, followed by application of a clear 2K-PU film and then being evaluated. The results are summarized in Table 11.

TABLE 11

| | DELTA-DC 3080 | P1 | P4 | P5 |
|---|---|---|---|---|
| Viscosity in mPa · s at rpm 60 and spindle 4 using brookfield viscometer | 1600 | 1650 | 1620 | 1550 |
| Color parameters | | | | |
| L | 95.4 | 95.36 | 95.61 | 95.38 |
| a | −0.7 | −0.67 | −0.70 | −0.71 |
| b | 0.1 | −0.18 | −0.13 | −0.10 |
| Hiding power | 3 | 2 | 1 | 1 |

Example 5

Dispersing agent of example P14 were diluted with a mixture of 2-methoxy propyl acetate and Aromatic 100 solvent mixture of 1:1 ratio to an active ingredient of 52%. It was then evaluated in unsaturated polyester car putty system against a commercial product Disperbyk 969 as mentioned in Table 12.

TABLE 12

| Component | Quantity (part or grams) |
|---|---|
| USP-EAGLE (BF36/62)62% | 32 |
| Dispersing agent | 1 |
| Styrene monomer | 3 |
| Titanium dioxide | 3 |
| Barium sulfate | 15.6 |
| Talc | 37 |
| Calcium carbonate | 7 |
| Aerosil 200 | 0.25 |
| Thixcin R | 0.5 |

USP-EAGLE (BF36/62)62%: a unsaturated polyester resin supplied by Eagle chemicals Dispersion was carried out for 30 minutes using a high speed disperser at 800 rpm. The prepared putty is then incubated for 1 month at 60° C. and tested for syneresis and settling. The comparison between P14 and the commercial product Disperbyk 969 is made according to Table 13.

TABLE 13

| | Commercial product | P14 |
|---|---|---|
| Viscosity in mPa · s at rpm 1 and spindle 4 using brookfield viscometer 24 hours after preparation | 93600 | 88000 |
| Syneresis | 3 | 1 |
| Settling[2] | 2 | 1 |

Syneresis is a score of 1 to 4 is given. 1 means little or no syneresis and 4 means strong syneresis.

Settling is a score of 1 to 4 is given. 1 means little or no settling and 4 means strong settling.

Example 6

Dispersing agent of example P15 was evaluated in dispersions of inorganic pigments in a water-based pigment paste against DELTA-DC 4073 (a commercial wetting and dispersing agent supplied by DELTA specialties) as mentioned in Table 14 below.

TABLE 14

| Component | Quantity (part or gram) - Dispersion I | Quantity (part or gram) Dispersion II |
|---|---|---|
| Bayferrox 3920 (PY42) | 60 | |
| Bayferrox 130M (PR101) | | 65 |
| Water | 30.4 | 25.4 |
| DELTA-FC 1590 | 0.6 | 0.6 |
| Dispersing agent | 9 | 9 |

Bayferrox 3920: a yellow iron oxide pigment supplied by Lanxess

Bayferrox 130M: a red iron oxide pigment supplied by Lanxess

DELTA-FC 1590: a silicone based emulsion defoamer supplied by DELTA specialties

Grinding was carried hour for 1.5 hour in a Skandex shaker using glass beads as a grinding media. The prepared colorants are then used to tint a ready matt water based emulsion paint. The results for the prepared pastes and the tinted system are then evaluated as below in Table 15.

TABLE 15

| | DELTA-4073 (PY42) | P15 (PY42) | DELTA-4073 (PR101) | P15 (PR101) |
|---|---|---|---|---|
| Viscosity in mPa · s at rpm 60 and spindle 4 using brookfield viscometer | 2290 | 2180 | 2510 | 2300 |
| Tinting strength | L | HHH | L | H |

Tinting strength: a relative evaluation is given to compare the samples. H means higher, L means lower and E means equal tinting strength.

Example 7

Dispersing agent of example P13 was evaluated in solvent free epoxy mid-grey color coating against DELTA-S 5206 (a commercial wetting and dispersing agent from DELTA specialties) with following spec according to Table 16.

TABLE 16

| Component | Quantity (part or gram) |
|---|---|
| Epotec YD-128 | 37.4 |
| Lapox ARD-13 | 6 |
| Dispersing agent | 0.85 |
| DELTA-FC 1722 | 0.7 |
| Thixgel 34 | 0.5 |
| Titanium dioxide (Dupont R902) | 10 |
| Bayferrox 3920 (PY42) | 0.43 |
| MONARCH 570 | 0.4 |
| Barium sulfate | 18 |
| Calcium Carbonate | 22.9 |
| Benzyl alcohol | 1.8 |
| DELTA-SC 2780 | 1.0 |

Lapox ARD-13: a low viscosity, long chain aliphatic mono epoxide reactive diluent based on C12-C14 alcohol supplied by Atul company Thixgel 34: an organoclay rheological additive supplied by Zhejiang Auto Full Clay Chemical Co. Ltd.

DELTA-FC 1722: a silicone containing defoamer supplied by DELTA specialties.

MONARCH 570: a high structure carbon black pigment supplied by Cabot corp.

DELTA-SC 2780: an acrylate based flow and leveling agent supplied by DELTA specialties Grinding was carried hour for 1 hour in a Skandex shaker using glass beads as a grinding media. The prepared paint is then mixed with the equivalent amount of a commercially available polyamide hardener for curing. Drawdown films are applied and then being evaluated. The results are summarized in Table 17.

TABLE 17

| | DELTA-S 5206 | P14 |
|---|---|---|
| Viscosity in mPa · s at rpm 60 and spindle 4 using brookfield viscometer 24 hours after preparation | 8200 | 5200 |
| Color strength | L | HH |
| Floatation in drawdown films | 4 | 1 |
| Pigments separation in glass cylinders after 48 hours of paint storage | 3 | 1 |

Color strength is a relative scoring is given to compare the two samples. H means higher, L means lower and E means equal tinting strength.

Rubbing of drawdown films are done and then floatation is judged by giving a core from 1 to 4 where 1 is no floatation and 4 is strong floatation.

As for pigments separation, paint is placed in a glass cylinders and left for 48 hours and then signs of pigments separation are evaluated and score from 1 to 4 are given where 1 is no separation and 4 is strong separation.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

What is claimed is:

1. A phosphoric acid ester of a Formula as follows:

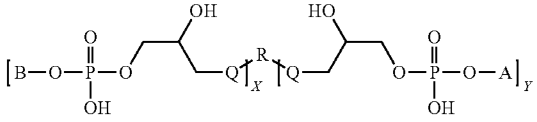

wherein:

A, B and R represents an aliphatic, cycloaliphatic and/or aromatic moiety;

Q represents —$CH_2$—, —O— or —COO—; and

X+Y is less than 7, and wherein the phosphoric acid ester has an average molecular weight $M_n$ of 70 to 10,000 g/mol.

2. The phosphoric acid ester as claimed in claim 1, wherein in said phosphoric acid ester, R represents an alkyl or aryl group or an aliphatic alcohol/carboxylic acid, aromatic alcohol/carboxylic acid, aliphatic alcohol alkoxylate, aliphatic alcohol alkoxylate carboxylic acid, aromatic alcohol alkoxylate, aromatic alcohol alkoxylate carboxylic acid, alkyl-aryl alkoxylate, alkyl-aryl alkoxylate carboxylic acid, aryl alkoxylate or aryl alkoxylate carboxylic acid.

3. The phosphoric acid ester as claimed in claim 1, wherein in said phosphoric acid ester, A and B are the same or different, and represent each an alkyl or aryl group, an alkoxylated alcohol group, an alkyl aryl alkoxylate or aryl alkoxylate group.

4. The phosphoric acid ester as claimed in claim 3, wherein A and/or B are modified with a carboxylic ester functional group or an urethane functional group.

5. The phosphoric acid ester as claimed in claim 4, wherein such carboxylic ester functional group is from a polycaprolactone.

6. The phosphoric acid ester as claimed in claim 5, wherein the polycaprolactone is an alcohol ethoxylate modified polycaprolactone.

7. A process for the making of the phosphoric acid ester as claimed in claim 1, comprising the step of:

reacting an alkyl or aryl epoxide or mono/poly glycidyl ether/ester of formula (III):

Formula (III)

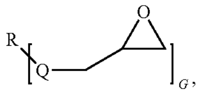

wherein R and Q are as defined in claim 1, and

G is an integer from 1 to 7;

with:

a monophosphate ester of formula (IV) or (V):

Formula (IV)

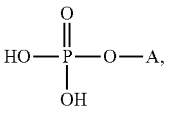

or

Formula (V)

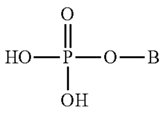

wherein A and B are as defined in claim 1.

8. The process as claimed in claim 7, wherein the monophosphate ester of Formula (IV) or (V) is a reaction product of A or B with polyphosphoric acid or phosphorous pentoxide.

9. The process as claimed in claim 7, wherein in said phosphoric acid ester, R represents an alkyl or aryl group or an aliphatic alcohol/carboxylic acid, aromatic alcohol/carboxylic acid, aliphatic alcohol alkoxylate, aliphatic alcohol alkoxylate carboxylic acid, aromatic alcohol alkoxylate, aromatic alcohol alkoxylate carboxylic acid, alkyl-aryl alkoxylate, alkyl-aryl alkoxylate carboxylic acid, aryl alkoxylate or aryl alkoxylate carboxylic acid.

10. The process as claimed in claim 7, wherein in said phosphoric acid ester, A and B are the same or different, and represent each an alkyl or aryl group, an alkoxylated alcohol group, an alkyl aryl alkoxylate or aryl alkoxylate group.

11. The process as claimed in claim 10, wherein A and/or B are modified with a carboxylic ester functional group or an urethane functional group.

12. The process as claimed in claim 11, wherein such carboxylic ester functional group is from a polycaprolactone.

13. The process as claimed in claim 12, wherein the polycaprolactone is an alcohol ethoxylate modified polycaprolactone.

14. A method for wetting and/or dispersing particles in a liquid medium, the method comprising:

incorporating an amount of the phosphoric acid ester as claimed in claim 1, in the liquid medium, the liquid medium comprising said particles or the particles being added to the liquid medium after said amount of the phosphoric acid ester.

15. The method as claimed in claim 14, wherein the phosphoric acid ester is used in its acidic form or is neutralized with an alkali metal, ammonia or an organic amine.

16. The method as claimed in claim 15, wherein said alkali metal is sodium or potassium.

17. The method as claimed in claim 15, wherein the organic amine is monoalkyl, dilalkyl, trialkyl, monoalkanol, dialkanol, trialkanol amine derivative, fatty imidazoline derivatives, polyalkylenepolaymine or polalkyleneimine derivatives.

18. The method as claimed in claim 17, wherein the organic amine is trialkyl amines, tall oil fatty imidazoline or acrylate modified polyethyleneimines.

19. The method as claimed in claim 14, wherein said particles comprises pigments, fillers or extenders in paint or coatings, composites, plastics, ink medium or mixture thereof.

20. The method as claimed claim 14, wherein the liquid medium comprises one or more of water, solvent, plasticizer or resin.

* * * * *